Nov. 12, 1935.  D. C. MULLER  2,021,015
ILLUMINATING COMPACT
Filed Feb. 28, 1935

Inventor
Daniel C. Muller
By Miller & Miller
Attorneys

Patented Nov. 12, 1935

2,021,015

UNITED STATES PATENT OFFICE 2,021,015

ILLUMINATING COMPACT

Daniel C. Muller, Hollis, N. Y.

Application February 28, 1935, Serial No. 8,754

2 Claims. (Cl. 240—6.45)

This invention relates to an illuminating compact and has for an object to provide an improved illuminating compact which while useful in the day time is especially useful in the evening and night time when there is an absence of sufficient illumination for the normal use of the compact.

With the illuminating compact of the present invention it is possible to direct a light from the compact to any particular part of the face, such as the lips, the cheeks, or the eyebrows by means of a special light reflector separate and distinct from the mirror which is provided for observing one's reflection while making use of the compact. This light reflector is so hinged that it will remain set at any particular angle during use and when not in use may be folded down allowing the compact to be closed for carrying purposes.

Figure 1:
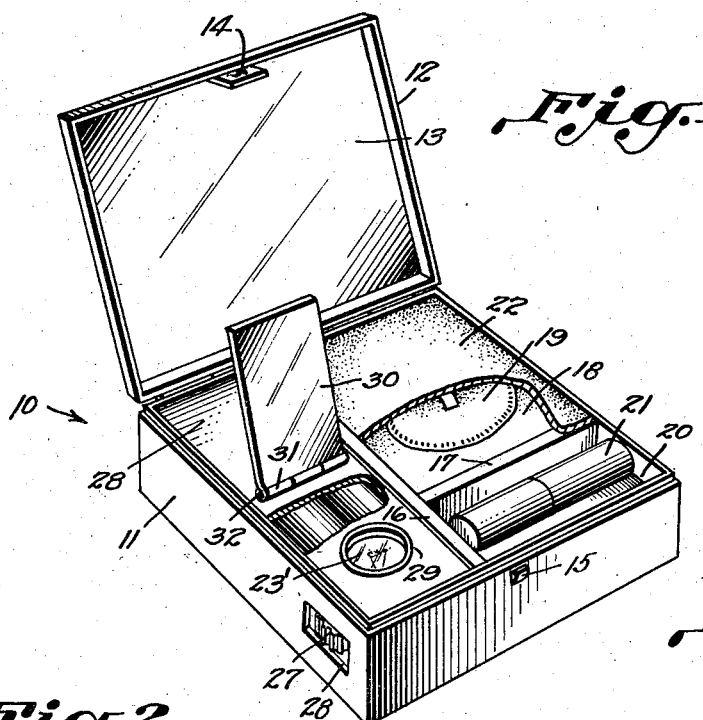
Figure 2:
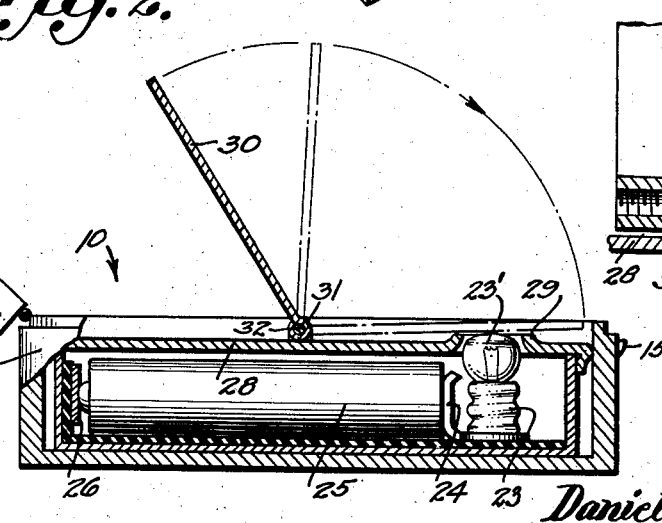
Figure 3:
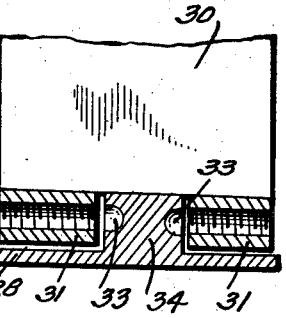

With the foregoing and other objects in view, as will hereinafter become apparent, this invention comprises the constructions, combinations and arrangements of parts, hereinafter set forth, disclosed and shown on the accompanying drawing. In this drawing, Figure 1 is a perspective view of the invention, Figure 2 is a sectional view of the illuminated reflector, and Figure 3 is an enlarged fragmentary sectional view of the hinged reflector.

There is shown at 10 a compact to which this invention has been applied. This compact 10 includes a container 11 and a cover 12 provided with a mirror 13 with which to observe one's self as the compact is being used. A conventional latch 14 on the cover 12 is provided for cooperation with the press catch 15 extending through the front of the container 11.

The container 11 is divided by a longitudinal partition 16 into two compartments, one for the light and one for the vanity, and the vanity compartment is subdivided by a transverse partition 17 into a powder compartment 18 wherein may be placed the powder puff 19 and a second or lipstick compartment 20 for receiving the lipstick holder 21. A suitable cover 22 is provided for the compact compartment. The light compartment is provided with a grounded lamp socket 23 adapted to receive an illuminating lamp 23'. This lamp socket 23 is electrically and mechanically connected to a spring contact 24 which is adapted to receive the base of a battery 25 in electrical contact therewith. The other end of the battery 25 is placed in electrical contact with the conductor 26 which leads back along the sides of the compartment to a switch 27 extending through a window 28 formed in the side of the container 11. Manipulation of the switch 27 serves to make or break the circuit to the lamp 23' by grounding the conductor 26 to the container 11 to cause the lamp to be illuminated when desired.

A cover 28 is provided for the light compartment and has a lipped opening 29 through which the lamp 23' may extend to project its beam. Secured to this cover 28 is a polished metal reflector 30. This reflector 30 is provided with a pair of threaded sleeves 31 spaced apart along its bottom edge through which may pass a pair of threaded pintle screws 32 and enter well 33 provided in a cylindrical shaped boss 34 secured to the top of cover 28.

As will be apparent, by tightening the screws 32 the hinge formed thereby will have its frictional resistance increased so as to support the light reflector 30 at any desired angle. Obviously, the screws 32 may be tightened or loosened as desired according to the amount of friction that it is desired to create in this hinge, the screws being tightened as wear takes place so as to keep the friction sufficiently constant to support the reflector 30 at the desired angle.

In operation the mirror 13 will be held at an angle suitable to the eye to allow the portion of the face being observed to be properly reflected. This angle, however, will not be such as to cause the maximum amount of illumination from the lamp 23' to be directed to the desired part of the face. For this purpose, the light reflector 30 will be suitably moved until it is set at the desired angle and it will be retained at this desired angle by friction, thereby directing illumination from the lamp 23' to the desired spot. When not in operation the reflector 30 may be closed to the down position thereby allowing the cover 12 to be closed when the compact is not in use.

The novel features and the operation of this device will be apparent from the foregoing description. While the device has been shown and the structure described in detail, it is obvious that this invention is not to be considered limited to the exact form disclosed and that changes may be made therein within the scope of what is claimed without departing from the spirit of the invention.

Having thus set forth and disclosed the nature of this invention, what is claimed is:

1. An illuminating compact comprising a container having a viewing mirror, a compact compartment, and an illumination means holding compartment, a cover for said illumination means holding compartment, a light reflector frictionally hinged to said cover to remain at any set angle to reflect light at the desired angle, said frictional hinge comprising threaded sleeve means secured to said light reflector, a boss secured to said illuminating means compartment cover, and a threaded screw extending through said threaded sleeve into said boss.

2. An illuminating compact comprising a container, a cover for said container, a viewing mirror secured to said cover, a longitudinal partition dividing said container into a vanity compartment and an illumination means holding compartment, a cover for said illumination means holding compartment, and illuminating means comprising a battery and a lamp within said compartment, a lipped aperture in said compartment cover allowing said lamp to project light rays therethrough, and a light reflector hinged to said cover.

DANIEL C. MULLER.